US005559559A

United States Patent [19]
Jungo et al.

[11] Patent Number: 5,559,559
[45] Date of Patent: * Sep. 24, 1996

[54] TRANSMITTING A SECONDARY SIGNAL WITH DYNAMIC INJECTION LEVEL CONTROL

[75] Inventors: Charles Jungo, Gilbert; Gerald D. Montgomery, Mesa; Christopher J. Schur, Payson, all of Ariz.

[73] Assignee: WavePhore, Inc., Tempe, Ariz.

[*] Notice: The portion of the term of this patent subsequent to Feb. 7, 2012, has been disclaimed.

[21] Appl. No.: 76,199

[22] Filed: Jun. 14, 1993

Related U.S. Application Data

[63] Continuation-in-part of Ser. No. 947,134, Sep. 18, 1992, Pat. No. 5,387,941, which is a continuation-in-part of Ser. No. 715,920, Jun. 14, 1991, Pat. No. 5,327,237.

[51] Int. Cl.⁶ .............................. H04N 7/08; H04N 11/00
[52] U.S. Cl. .......................... 348/432; 348/426; 348/473; 348/467
[58] Field of Search .................................. 348/473–475, 348/461, 432, 433, 436, 665, 607, 608, 478, 464, 468, 476, 17, 13, 12, 6, 678, 697, 680, 426, 470, 385, 386, 384, 387, 391, 427, 429; 370/69.1, 123, 76, 57, 121; 455/5.1; 375/98; H04N 7/087, 7/08, 7/00, 11/00

[56] References Cited

U.S. PATENT DOCUMENTS

| | | | |
|---|---|---|---|
| 2,635,140 | 4/1953 | Dome | 348/492 |
| 2,838,597 | 6/1958 | De Vrijer | 178/5.2 |

(List continued on next page.)

FOREIGN PATENT DOCUMENTS

| | | | |
|---|---|---|---|
| 0156709 | 10/1985 | European Pat. Off. | H04N 7/093 |
| 0246698 | 11/1987 | European Pat. Off. | 358/147 |
| 20263449 | 4/1988 | European Pat. Off. | H04N 1/00 |
| 10278192 | 8/1988 | European Pat. Off. | H04N 7/08 |
| 0308241 | 9/1988 | European Pat. Off. | H04N 7/06 |
| 20356903 | 3/1990 | European Pat. Off. | H04N 7/04 |
| 0360615 | 3/1990 | European Pat. Off. | H04N 7/08 |
| 10365431 | 4/1990 | European Pat. Off. | H04L 5/02 |
| 0530669 | 8/1992 | European Pat. Off. | H04N 7/08 |
| 61-92084 | 5/1986 | Japan | H04N 7/08 |
| 0206990 | 9/1987 | Japan | H04N 11/020 |
| 62-236288 | 10/1987 | Japan | H04N 7/08 |
| 63-46084 | 3/1988 | Japan | H04N 7/00 |
| 63-86987 | 5/1988 | Japan | H04N 7/00 |
| 1-089886 | 4/1989 | Japan | 358/147 |
| 3-148979 | 6/1991 | Japan | H04N 7/12 |
| 92/22984 | 12/1992 | WIPO | H04N 7/08 |
| 9406627 | 12/1994 | WIPO | H04N 7/08 |

OTHER PUBLICATIONS

International Search Report for International Application No. PCT/US92/03711 filed Apr. 5, 1992.

King, Patrick T., *A Novel Television Add–On Data Communication System*, Journal of the SMPTE, vol. 83, Jan. 1974, pp. 10–13.

Maebara, Akiyoski and Seizo Tamai, *A Television Facsimile System Employing an Additional Carrier*, New Broadcasting System Research Group, Serial No. 151, Feb. 1972.

Christiansen, M.; T. Røste; and J. N. Skalvik, *A Video Scrambler/Descrambler Concept for the PAL Format*, Journal of the Institution of Electronic and Radio Engineers, vol. 57, No. 1, Jan./Feb. 1987 pp. 27–35.

(List continued on next page.)

*Primary Examiner*—Safet Metjahic
*Attorney, Agent, or Firm*—Loeb & Loeb LLP

[57] ABSTRACT

A secondary signal is processed and injected into a primary video signal. The injection level of the secondary signal is dynamically controlled to reduce transmission errors in the secondary signal, and to minimize interference and power level limitations. The injection level of the secondary signal may be based on video analysis of the primary signal or on error information fed back from a receiver which receives the transmitted secondary signal.

27 Claims, 5 Drawing Sheets

U.S. PATENT DOCUMENTS

| | | | |
|---|---|---|---|
| 3,529,081 | 9/1970 | Rider | 178/5.86 |
| 3,530,232 | 9/1970 | Reiter | 380/15 |
| 3,543,169 | 11/1970 | Hill | 358/171 |
| 3,632,863 | 1/1972 | Hirashima et al. | 348/473 |
| 3,679,816 | 7/1972 | Avins et al. | 358/19 |
| 3,700,793 | 10/1972 | Bursuk et al. | 178/6.8 |
| 3,726,992 | 4/1973 | Eguchi et al. | 348/461 |
| 3,845,326 | 10/1974 | Godden | 307/230 |
| 3,925,639 | 12/1975 | Hester | 235/61.11 E |
| 3,927,250 | 12/1975 | Rainger | 178/5.6 |
| 4,051,532 | 9/1977 | Hilbert et al. | 358/142 |
| 4,065,784 | 12/1977 | Rossi | 348/382 |
| 4,074,199 | 2/1978 | de Jager et al. | 325/50 |
| 4,141,041 | 2/1979 | Peters | 348/588 |
| 4,155,039 | 5/1979 | Lechevin | 325/20 |
| 4,177,405 | 12/1979 | Chapdelaine | 315/159 |
| 4,183,054 | 1/1980 | Patisaul et al. | 358/86 |
| 4,208,630 | 6/1980 | Martinez | 375/7 |
| 4,209,748 | 6/1980 | Weber | 455/47 |
| 4,231,114 | 10/1980 | Dolikian | 455/49 |
| 4,354,200 | 10/1982 | Haenen et al. | 358/23 |
| 4,379,947 | 4/1983 | Warner | 179/1 GD |
| 4,424,593 | 1/1984 | Kahn | 455/47 |
| 4,450,477 | 5/1984 | Lovett | 358/86 |
| 4,479,226 | 10/1984 | Prabhu et al. | 375/1 |
| 4,513,415 | 4/1985 | Martinez | 370/92 |
| 4,538,174 | 8/1985 | Gargini et al. | 358/86 |
| 4,539,707 | 9/1985 | Jacobs et al. | 455/47 |
| 4,551,754 | 11/1985 | Meise et al. | 358/180 |
| 4,556,973 | 12/1985 | Uemura | 370/69.1 |
| 4,578,815 | 3/1986 | Persinotti | 455/15 |
| 4,586,078 | 4/1986 | Citta et al. | 358/86 |
| 4,591,906 | 5/1986 | Morales-Garza et al. | 358/84 |
| 4,602,279 | 7/1986 | Freeman | 358/86 |
| 4,622,694 | 11/1986 | Weber et al. | 455/47 |
| 4,626,913 | 12/1986 | Gurumurthy | 358/147 |
| 4,639,786 | 1/1987 | Tamer et al. | 348/737 |
| 4,647,983 | 3/1987 | Ota | 358/310 |
| 4,660,072 | 4/1987 | Fukinuki | 348/436 |
| 4,665,431 | 5/1987 | Cooper | 358/145 |
| 4,670,773 | 6/1987 | Silverberg | 348/427 |
| 4,688,097 | 8/1987 | Lin | 380/15 |
| 4,695,900 | 9/1987 | Honjo et al. | 358/310 |
| 4,745,476 | 5/1988 | Hirashima | 358/145 |
| 4,750,034 | 6/1988 | Martinez | 358/174 |
| 4,750,206 | 6/1988 | Schotz | 381/4 |
| 4,800,428 | 1/1989 | Johanndeiter et al. | 358/142 |
| 4,805,020 | 2/1989 | Greenberg | 358/142 |
| 4,807,031 | 2/1989 | Broughton et al. | 358/142 |
| 4,831,443 | 5/1989 | Heinz | 358/147 |
| 4,855,811 | 8/1989 | Isnardi | 348/433 |
| 4,879,606 | 11/1989 | Walter et al. | 358/330 |
| 4,884,139 | 11/1989 | Pommier | 358/142 |
| 4,958,230 | 9/1990 | Jonnalagadda et al. | 358/186 |
| 4,969,041 | 11/1990 | O'Grady et al. | 358/142 |
| 4,985,769 | 1/1991 | Yasumoto et al. | 358/141 |
| 5,014,125 | 5/1991 | Pocock et al. | 358/86 |
| 5,029,003 | 7/1991 | Junnalagadda | 348/493 |
| 5,057,920 | 10/1991 | Wilkinson | 358/171 |
| 5,063,446 | 11/1991 | Gibson | 358/142 |
| 5,075,773 | 12/1991 | Pullen et al. | 358/141 |
| 5,103,297 | 4/1992 | Yamade | 358/31 |
| 5,103,310 | 4/1992 | Gibson et al. | 348/608 |
| 5,136,411 | 8/1992 | Paik et al. | 359/125 |
| 5,142,354 | 8/1992 | Suzuki et al. | 358/34 |
| 5,157,359 | 10/1992 | Nogami et al. | 332/117 |
| 5,157,491 | 10/1992 | Kassatly | 358/146 |
| 5,172,413 | 12/1992 | Bradley et al. | 380/20 |
| 5,177,604 | 1/1993 | Martinez | 358/86 |
| 5,200,822 | 4/1993 | Bronfin et al. | 358/142 |
| 5,243,423 | 9/1993 | DeJean et al. | 358/142 |
| 5,315,617 | 5/1994 | Guida et al. | 348/426 |
| 5,319,455 | 6/1994 | Hoarty et al. | 348/7 |
| 5,327,237 | 7/1994 | Gerdes et al. | 348/476 |
| 5,387,941 | 2/1995 | Montgomery et al. | 348/473 |
| 5,410,360 | 4/1995 | Montgomery | 348/473 |

OTHER PUBLICATIONS

Gerdes, Richard, "Using Genesys™ HDTV Technologies for Today's Expanded NTSC Service". Presented at 1990 Spring Engineering Conference, National Association of Broadcasters, Apr. 1, 1990. Atlanta, GA.

Gerdes, Richard, "Waveform Modulation as Used in Television Applications". Presented at RF Technology Expo 90, Mar. 28, 1990. Anaheim, CA.

Gerdes, Richard, "Genesys™ HDTV Technologies Expand Existing NTSC Service", Presented at the 24th Annual SMPTE Television Conference, Society of Motion Picture and Television Engineers, Jan. 1990, Lake Buena Vista, FL.

Gerdes, Richard, "Arizona Based HDTV:; The Genesys™ Technologies." Presented at Phoenix Chapter of the Society of Broadcast Engineers, Arizona Broadcasters Association Fall Meeting, November 10, 1989. Phoenix, AZ.

Gerdes, Richard, "HDTV Management Timetable." Presented at Challenges in Teleproduction, The Internat'l Teleproduction Society Annual Forum, Sep. 17, 1989. Los Angeles, CA.

Gerdes, Richard, "The Use of Genesys™ Technology for HDTV". Presented at the 130th SMPTE Technical Conference, Society of Motion Picture and Television Engineers, Inc., Oct. 15–19, 1988.

King, Patrick T., "A Novel TV Add–On Data Communication System," I.E.E.E. Transactions on Broadcast and Television, vol. BTR–19, No. 4, pp. 225–230; Nov. 1973.

Intnl. Search Report nfor Intnl. Application No. PCT/US92/10406 filed Oct. 7, 1993.

Genesys: Transmission System for HDTV.

Tomasi, Wayne, *Electronic Communications Systems: Fundamentals Through Advanced* Prentice Hall, New Jersey, 1988, p. 481.

TRANSMITTING A SECONDARY SIGNAL WITH DYNAMIC INJECTION LEVEL CONTROL

RELATED APPLICATIONS

This application is a Continuation-In-Part of U.S. Pat. No. 5,387,941, filed Sep. 18, 1992 U.S. Ser. No. 07/947,134, which is a Continuation-In Part of U.S. patent application Ser. No. 07/715,920 filed on Jun. 14, 1991, now U.S. Pat. No. 5,327,237.

BACKGROUND OF THE INVENTION

1. Field of the Invention

This invention relates to transmitting a secondary signal with a video signal, and more particularly to dynamically controlling the injection level of the secondary signal.

2. Description of the Prior Art

The video spectrum in common commercial formats, such as NTSC, PAL, and SECAM, is not efficiently used. To overcome this inefficiency, several different video spectrum formats have been proposed. However, these formats, such as Japanese HDTV, cannot be received by the conventional television receivers in common USe.

Another approach to efficiently using the spectrum of a video signal is to time multiplex the video signal with a secondary signal. This approach is used for transmitting close captioned information with the video signal. In particular, the close captioned information is transmitted during the vertical blanking intervals. A specially designed receiver may receive and display close captioned information, while commonly available commercial receivers may display the transmitted signal without any perceptible visual defects in the image. However, the data transmission rate is low, thus, limiting the amount of information that may be transmitted.

Another method, is to place a secondary signal in the 2–3 Mhz range, which lies between the peak portions of the chrominance and luminance spectrum envelopes and coinciding with the chrominance spectrum. An example of this is shown in "A Novel Television Add-On Data Communication System", by Patrick T. King in Vol. 33 of Journal of the SMPTE (January 1974). The method uses odd multiples of one half the scanning rate, which results in the spectral energy of the secondary signal overlapping with the chrominance information. The resultant transmitted data rate of the secondary signal must remain low (i.,e., under 21 kilobits per second) and the secondary signal must be transmitted at low power to avoid interference with the chrominance information. The low power injection level of the secondary signal increases the likelihood of transmission errors, especially if there is a long or noisy transmission link between the transmitter and receiver.

These approaches are inappropriate for many transmitters, such as used in satellite links or cable television, have limited transmit power amplification (or "head room"). The "head room" limits the amount of power available for the transmission of a signal. Where a secondary signal is transmitted with a primary signal, the transmission of the secondary signal uses some of the power amplification. Hence less power amplification is available for the primary signal. Still further the amplified secondary signal appears as noise to the receiver of the primary signal. Thus, when the secondary signal is injected, the signal to noise ratio for the primary signal may be substantially decreased, increasing the level of interference and the possibility of transmission errors.

Therefore, it is a first object of this invention to provide a system having a more efficient use of the video spectrum in common commercial formats. It is a second object of this invention to provide for more efficient use of the video spectrum without interfering with the transmission of the underlying video signal. It is yet a further object of the invention to permit the reduction in transmission errors of a secondary signal.

SUMMARY OF THE INVENTION

These and other objects are achieved through the use of dynamic injection level control of a secondary signal into a primary signal. In particular embodiments of the present invention, a processor is used to combine a secondary signal with a primary video signal for subsequent transmission. The processor includes a dynamically controlled level injector, such as a gain controlled amplifier for injecting the secondary signal, at different injection levels, into the primary video signal to reduce transmission errors. The processor also includes a primary signal section, which provides the primary video signal, and a secondary signal section which provides a rasterized version of the secondary signal for injection into the primary video signal.

In one embodiment of the present invention, the processor may include one or more video power analyzers which analyze the average power level of one or more portions of the primary video signal. From this analysis or these analyses, the video power analyzer provides a control signal to the dynamically controlled level injector, proportional to the power level of the analyzed primary video signal portions. The dynamically controlled level injector alters the injection level of the secondary signal in response to the control signal. The injection level of the secondary signal is adjusted to increase the injection level when the analysis shows that the power level of the relevant portions of the primary video signal has increased.

In another embodiment, where there may be a limited amount of "headroom" for the power of the combined signal, the power analysis will determine the average power in the primary video signal and alter the injection level so that the total power of the combined signals remains a constant. Thus, the remaining portion of the primary video signal may be amplified as much as if no secondary signal were present, reducing "head room" power limitations of a transmitter.

In a third embodiment of the present invention, the processor may be responsive to error information correlated to transmission errors detected at the receiver of the secondary signal. The dynamically controlled level injector responds to error information and alters the injection level of the secondary signal to reduce errors, When certain predetermined error conditions are detected, the injection level is increased. In additional embodiments, the dynamically controlled level injector decreases the injection level of the secondary signal when the error information indicates the error rate is below a predetermined level.

In another embodiment of the present invention the processor may be responsive to both a control signal from a video power analyzer and to error information representative of transmission errors detected at the receiver of the secondary signal. The dynamically controlled level injector responds to both the error information and the control signal, in altering the injection level of the secondary signal, to reduce errors in the secondary signal transmission and to reduce "headroom" problems.

Other features and advantages of the invention will become apparent from the following detailed description, taken in conjunction with the accompanying drawings, which illustrate, by way of example, various features of embodiments of the invention.

DETAILED DESCRIPTION OF THE EMBODIMENTS

Figure 1:
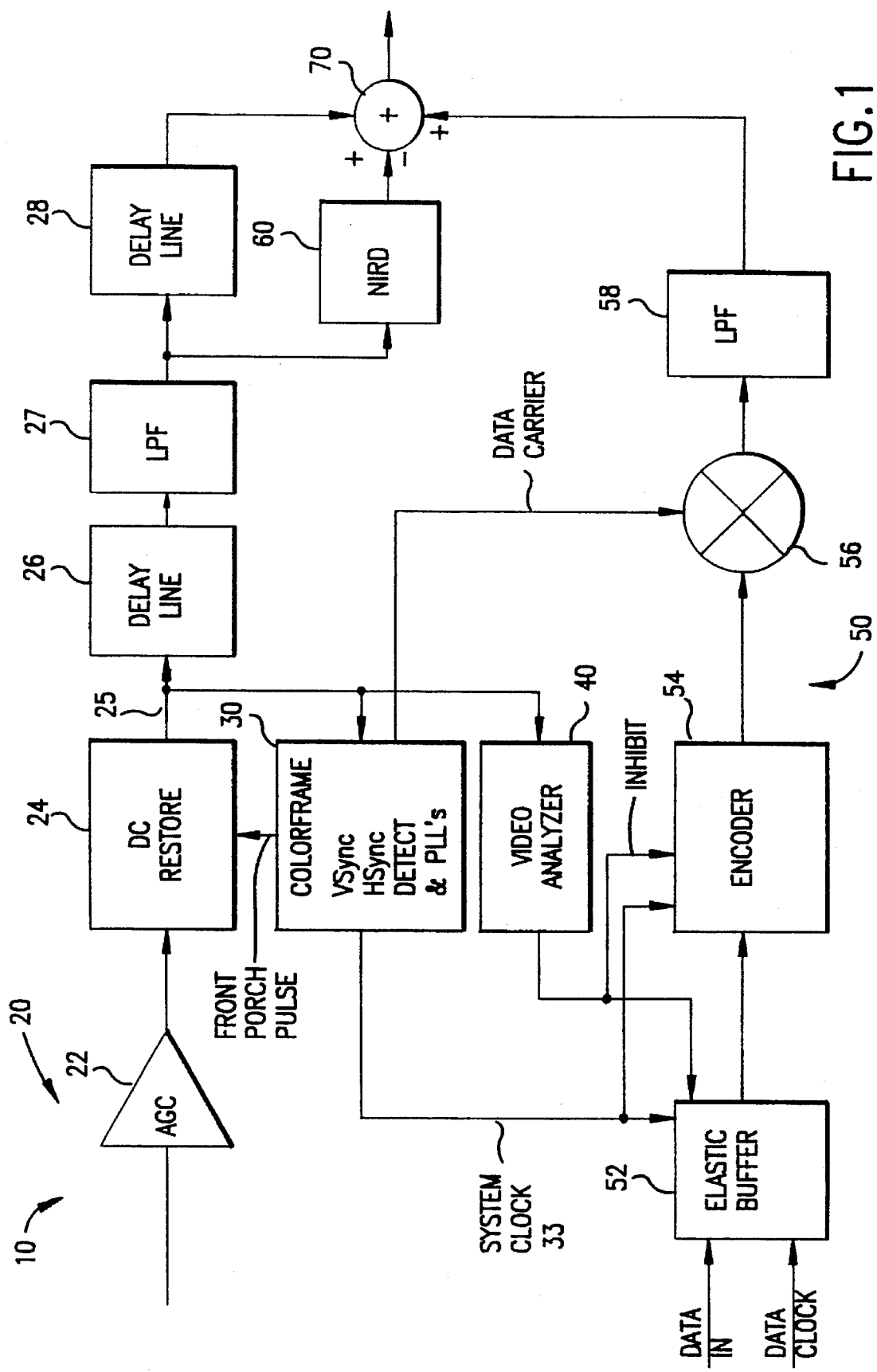
FIG. 1 is a block diagram for a signal processor incorporating an embodiment of the present invention for use in a transmitter.

As shown in the drawings for purposes of illustration, an embodiment of the present invention comprises a processor for dynamically controlling the injection level of a secondary signal that is at least partially frequency interleaved into a primary video signal. An embodiment of a processor 10 is shown in FIG. 1. The processor 10 is for use in a transmitter and may be part of a TV network hub 210 coupled to a network 208 of FIG. 4. This processor 10 transmits a primary NTSC video signal 12 with a secondary signal 49. The magnitude of the secondary signal is controlled by a dynamic injection level controller 44, which controls the level of injection of the secondary signal 49 into the primary video signal 12. Other embodiments of the present invention may be used for controlling the injection level of the secondary digital data signal and transmitting digital data at high data rates or analog information with either just an NTSC video signal or another video format such as SECAM or PAL.

Figure 3:
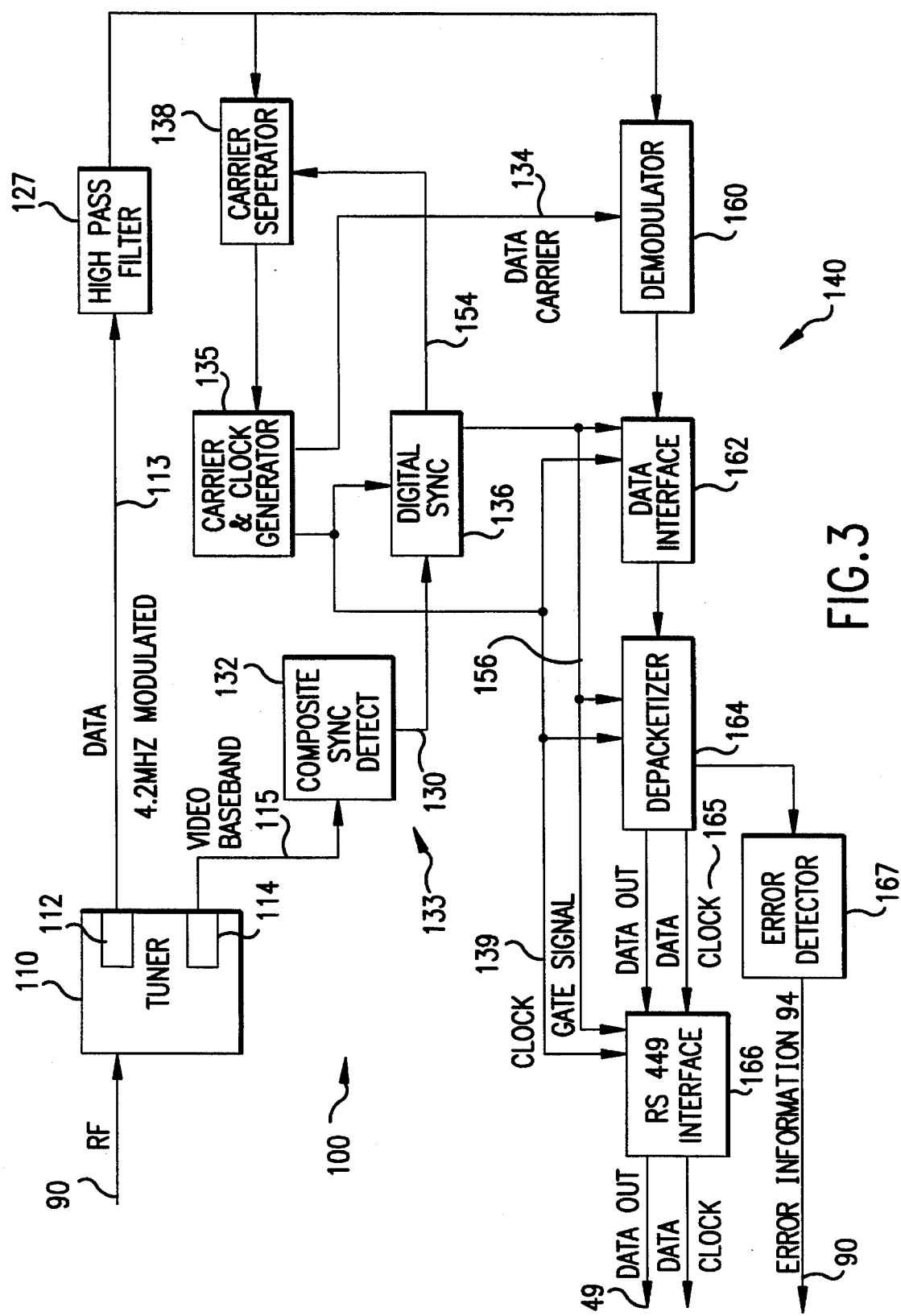
FIG. 3 is a block diagram for a signal processor incorporating an embodiment of the present invention for use in a receiver.

The embodiment of FIG. 1 is virtually identical to the embodiment in FIG. 3 of U.S. Pat. No. 5,387,941 to Montgomery et al. filed Sep. 18, 1992, and the description of that embodiment on pages 17 through 23 is incorporated herein by reference. In the embodiment of FIG. 1, the secondary data signal is output by a data section 50 and combined with the output of a video section 20 at an adder 70.

In the embodiment of the present invention, the secondary signal 49 is preferably frequency interleaved with the video signal around non-integral odd quarter multiple of the scanning frequency located by being amplitude modulated with a carrier near the upper end of the video spectrum. This places most of the spectrum of the modulated secondary signal above the chrominance carrier in the chrominance sideband above 3.6 Mhz. To avoid interference with the secondary signal, the portion of the video signal above 3.6 Mhz., and particularly above 3.7 Mhz., is substantially attenuated by a low pass filter 27.

The instant processor differs from the embodiment of FIG. 3 of U.S. Pat. No. 5,387,941 to Montgomery et al. filed Sep. 18, 1992, in that a dynamic injection level controller 44 and a video power analyzer 41 are included.

In the embodiment of FIG. 1, a dynamic injection level controller 44 is coupled between the amplitude modulator 56 and the data equalizer delay amplifier 58. The dynamic injection level controller 44 may be coupled between the modulator 56 and the adder 70. Alternatively, the injection level could be controlled by altering the power level of the carrier 37. The dynamic injection level controller 44 takes the rasterized secondary signal from the data equalizer delay amplifier 58 and increases or decreases the amplitude of the secondary signal, and hence the power, before injecting the signal into the modulator 56 for amplitude modulation. The dynamic injection level controller 44 can be a gain controlled amplifier or the like, where it amplifies or attenuates the power level of the secondary signal in response to either an analog or digital control signal.

In the embodiment of FIG. 1, a video power analyzer 41 is coupled between the output of the DC restore circuit 24 and the dynamic injection level controller 44. The video power analyzer takes the primary video signal 12 to determine the power level of these portions of the chrominance upper sideband of the primary video signal 12 that are attenuated by the low pass filter 27. The video power analyzer may for example delay the output of the DC restore circuit 24 by the time delay of the filter 27. The output of the filter 27 is subtracted from the delayed output to provide a difference signal representative of the attenuation of the filter 27. Conventional circuitry or a digital signal processor may then produce a signal proportional to the power attenuated by the filter to control the injection level controller 44 for a time period such as one frame.

Once the primary signal is analyzed and the power level is known, using the known attenuation characteristics of the filter 27, the video power analyzer 41 generates a control signal to the dynamic injection level controller 44 to dynamically set the level of injection for the secondary signal 49. The control signal from the analyzer is such that the secondary signal 49 is injected at a power level that substantially corresponds to the amount of power attenuated from the primary video signal 12. In this way, problems associated with power "head room" limits may be reduced.

In particular, the signal to noise ratio of the transmitted primary signal is not substantially decreased. Substantially the same amount of power is available for amplifying the primary video signal as the injected power of the secondary signal is equal to the attenuated power of the upper chrominance sideband. In particular, the attenuated portion of the primary signal comprised of the upper chrominance side band is not needed for most conventional television receivers so the relative, useful signal strength as transmitted remains substantially the same.

Alternatively, a plurality of video analyzers 41 may be used with each video analyzer analyzing the average power in a field, a frame or a line for a different portion of the spectrum. For example, at a regular television receiver, the data is more noticeable to the viewer at lower power levels of chroma or luma. Therefore, it is desirable when these conditions exist to lower the injection level of the data, thereby reducing the perceptibility of the data as noise on an ordinary video receiver. Although the injection level has been lowered, the ability to separate the data from the video at the receiver remains substantially unchanged as the power level of the video signal has dropped.

In one alternative embodiment of the invention for an NTSC video signal, a video analyzer 41 may analyze the average power in a line, field, or frame in the luminance portion of the spectrum of the video signal between 600 kilohertz and 1.0 megahertz and a separate video analyzer may analyze the average power in the same line, field, or frame in the chrominance portion and particularly in the spectra above 2.1 Megahertz and preferably below the chrominance carrier at 3.59 MHZ and the lower end of the I and Q sidebands.

In this embodiment, if the average power of the luminance signal or the chrominance portion is low, the injection level of the data signal is lowered to limit perceptibility of the data. Similarly, if the average power for either or both is high, the injection level for the data is increased so that the data may be separated from the video at the receiver.

The specific function that may be used for controlling the injection level of the data with respect to the detected average power varies with the particular type of detectors used. The control function may be determined by empirically altering the data level based upon different combinations of the chrominance and luminance power levels and lowering the injection level until the interference, which appears as "snow" on the receiver is no longer noticeable to an ordinary television receiving the combined signal. The resultant control function may be stored in a memory as a look-up table (not shown). When the video analyzers 41 detect specific, average power levels for the luminance and chrominance portions of the video signal, these two data are used to look up in the table the appropriate injection level for the data. Further, to minimize the memory size and to avoid having a finite number of discrete injection levels, interpolation can be used between different detected power levels of the video signal. Alternatively, the control function may be embodied in an analog control circuit contained within the dynamic level injection level controller 44 for providing continuously alterable injection levels.

Although this specific example uses two different video analyzers analyzing only two broad spectrum bands of the video signal, more video analyzers may be included for analyzing narrower bands for even finer control of the injection level of the data signal. Also, although the period for averaging the power measurement by the video analyzer as a frame, a field or a line have been suggested, other alternatives may be used depending upon the nature of the video source signal. However, the averaging period of the analyzers 41 should be selected so that the data injection level is altered quickly enough to avoid perception of the data as "snow" on the screen at an ordinary receiver and to avoid high power luminance or chrominance from interfering with the reception of significance amount of data when the power levels change.

Figure 2:
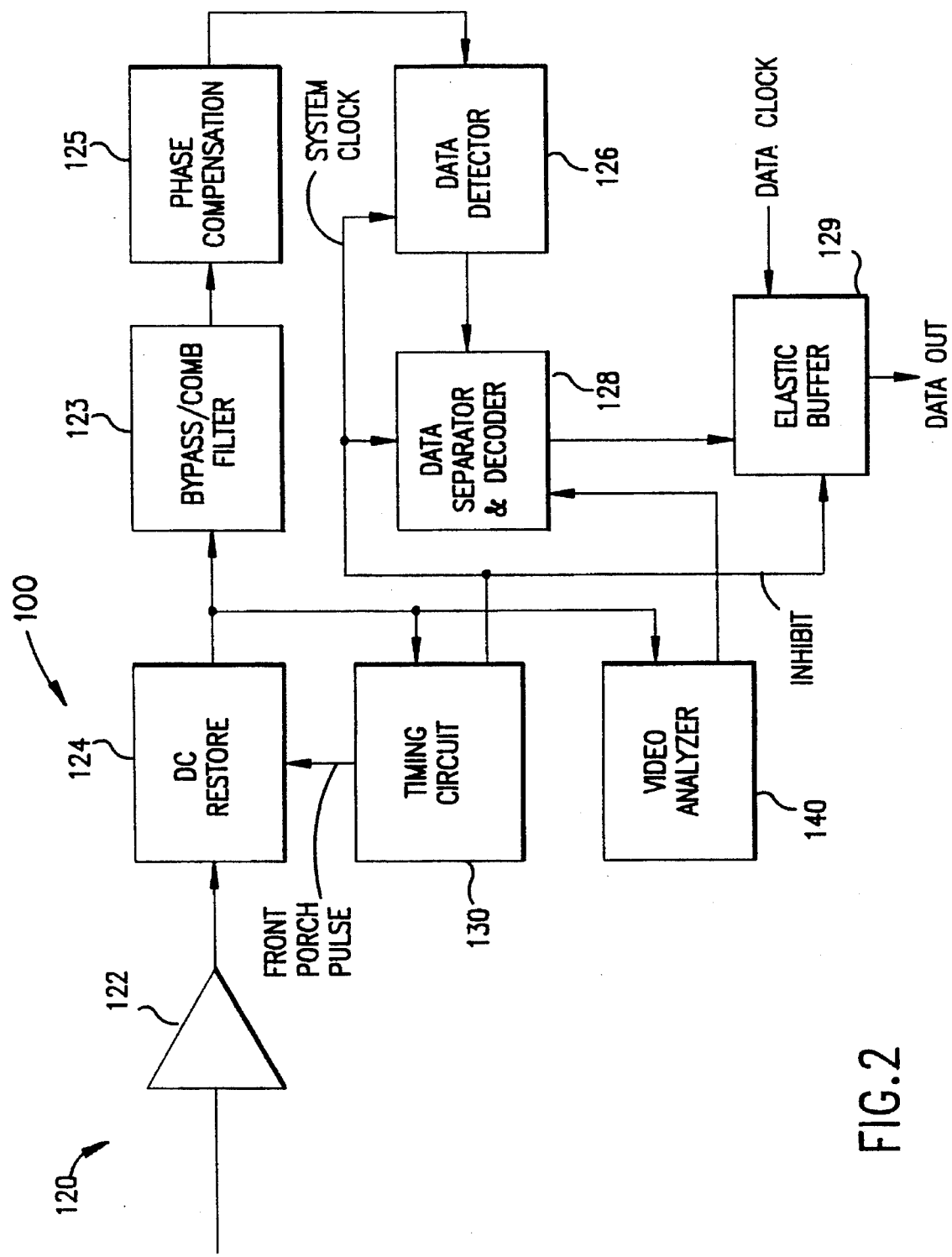
FIG. 2 is a block diagram for a signal processor incorporating another embodiment of the present invention for use in a transmitter.

In another embodiment, illustrated in FIG. 2 with like components bearing like numbers, the processor 10 receives error information. The error information 94 may be generated by a receiver 100 (shown in FIG. 3) which receives the transmitted signal from the processor 10 and is described in more detail below. The error information 94 contains information correlated to transmission errors detected by the receiver 100 upon reception of the transmitted secondary signal. The error information 94 provides the dynamic injection level controller 44 with information, in the form of a control word or the like sent over a network, causing the controller 44 to adjust the level of injection of the secondary signal 49 to reduce the transmission errors. For example, if the error information indicates a high error rate, the controller 44 may increase the injection level of the secondary signal 49. Conversely, if the error information indicates a low error rate or no errors, the controller 44 may decrease the injection level of the secondary signal 49. In this way, the secondary signal 49 may be transmitted over long transmission links without unacceptable error rates.

The dynamic injection level controller 44 may inject the secondary signal 49 at selectable levels. The injection levels may be for example in 3dB increments or may be continuous between −10dB and −30dB with respect to the primary video signal. The dynamic injection level controller 44 may also decrease the injection level of the secondary signal 49, if no error information 94 is received after a period of time. Further, if the error information is below a predetermined threshold, the dynamic injection level controller 44 may also reduce the injection level of the secondary signal 49. The processor 10 may have a manual override (not shown) which allows the system operators to override the automatic control provided by the error information 94.

It should be noted, that both the video power analyzer 41 and the error information receiver 42, of the embodiments of FIGS. 1 and 2, respectively, may be used together (not shown). This may allow the processor 10 to further minimize "head room" limitations and reduce transmission errors. Error information may be used to keep the transmission errors at a minimum, and both error information and video analysis may be used to balance the errors versus the amount of power used for amplifying the secondary signal instead of the primary signal. The combined information from the analyzer is used to alter the injected power of the secondary signal 49 to below the attenuated power of the primary video signal 12.

Though not shown, it is possible to combine the video power analyzer 41 and dynamic injection level controller 44 functions into a single block. The same would be true of combining the error information receiver 42 functions with either the video power analyzer 41 or the dynamic injection level controller 44 functions.

Figure 4:
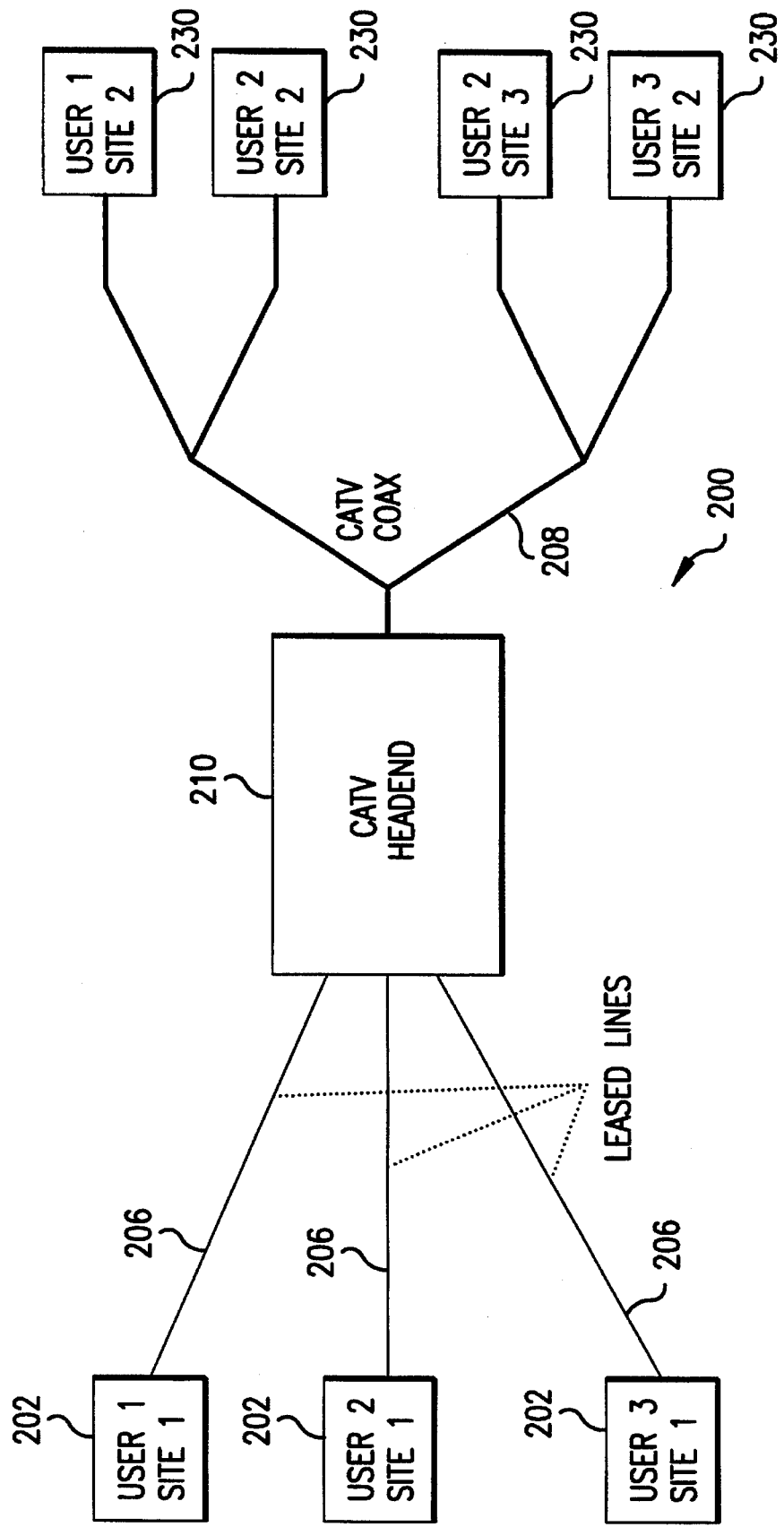
FIG. 4 is a block diagram for a two way computer network using a cable television transmission medium incorporating an embodiment of the instant invention.

The embodiment of FIG. 3 is virtually identical to the receiver embodiment in FIG. 4 of U.S. Pat. No. 5,387,941 to Montgomery et al. filed Sep. 18, 1992, and the description of that embodiment on pages 23 through 28 is incorporated herein by reference. The receiver of FIG. 3 is particularly applicable for receiving the transmitted signal. In the embodiment of FIG. 3, the received secondary data signal is output by data section 140 from the RF signal received by the tuner section 110.

The instant receiver differs from the embodiment of FIG. 3 from the processor of FIG. 4 of U.S. Pat. No. 5,387,941 to Montgomery et al. filed Sep. 18, 1992, in that an error detector 167 is included. The error detector 167 is coupled between the depacketizer 164 and a network 90 or the like. The error detector 167 determines the transmission errors for the received secondary signal by obtaining error data from the depacketizer 164, where the secondary signal may be received in packets, frames blocks or the like. If the packet, for instance, contains an error detection or correction code, the error detector 167 may determine an error rate by interpreting the results of the correcting or detecting of errors over a period of time. Alternatively, the error information may comprise the fact that a predetermined number of errors were detected in one or more blocks, packets or frames, that the number of errors detected exceeds the error correcting capacity of the given error correction code or the like. Still further, the error information may comprise a direction or request to increase or decrease the injection level based upon the detected errors. Once the desired parameter relating to errors is determined, the error detector 167 generates error information, containing information such as a control word or the like.

The error information is sent out from the receiver 100 to the error information receiver 42 in the separate processor 10 of FIG. 2, through for example, a network (not shown) or the like. This received error information 94 may then be used by the dynamic injection level controller 44 of FIG. 2 as described above. The error detector 167 may also feed back the error information only when the error information is above or below predetermined threshold. For example, if an error rate is above a first threshold, the injection level is increased while if the error rate is below a threshold, which may be the same as and different than the first threshold, the injection level is lowered.

Figure 5:
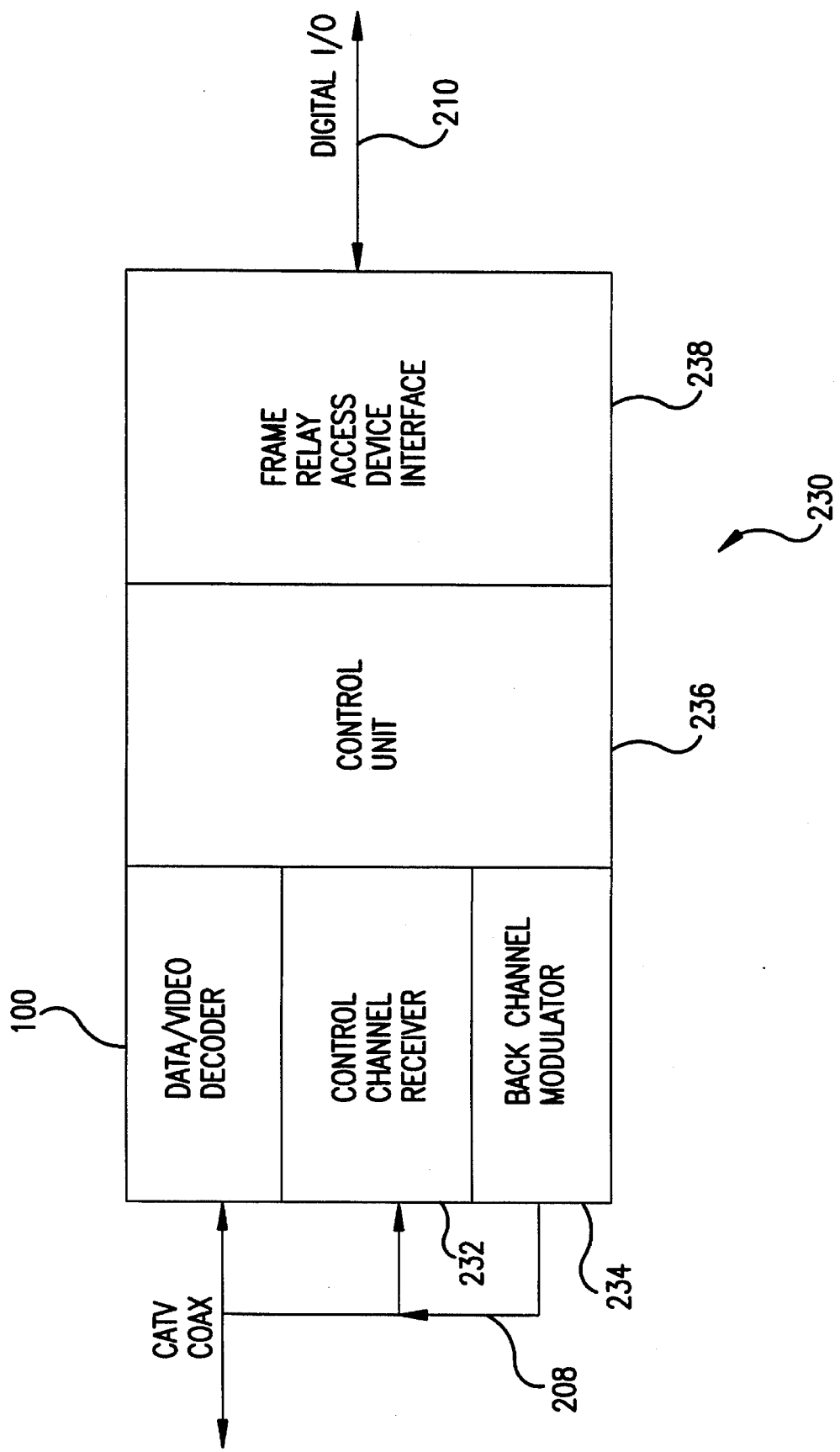
FIG. 5 is a block diagram for a network node used in the network embodiment of FIG. 4.

FIGS. 4 and 5 show an embodiment where a processor 10 of FIG. 2 and a receiver of FIG. 3 may be used. FIGS. 4 and 5 are virtually identical to the network embodiment in FIGS. 7–10 of U.S. Pat. No. 5,387,941 to Montgomery et al. filed Sep. 18, 1992, and the description of that embodiment on pages 30 through 34 is incorporated herein by reference. In the embodiment of FIG. 4, the secondary data signal 49 is combined with a primary video signal 12 and is transmitted to the network nodes 230 attached to the network hub 210. Alternatively, the processor 10 and receiver 100 may be part of a satellite communications link.

The instant network differs from the embodiment of FIGS. 7–10 of U.S. Pat. No. 5,387,941 to Montgomery et al. filed Sep. 18, 1992, in that the network hub 210 has a processor 10 with a dynamic injection level controller 44 as described in FIG. 2 above. Further, the network nodes 230 have receivers 100 which include an error detector 167 and transmitter as described in FIG. 3 above.

The processor 10, in the network hub 210, processes the modulated rasterized secondary signal and combines that modulated signal by injection into the primary signal 12 to provide a combined signal. The combined signal is transmitted to the network nodes 230 via network lines 208.

The injection level of the modulated rasterized version of secondary signal 49 is controlled by the injection level controller 44, which amplifies or attenuates the rasterized secondary signal as required. The dynamic controller 44, may use video analysis from a video power analyzer 41 of FIG. 1 and/or error information 94 generated by the receivers 100 in the network nodes 230 to dynamically control the injection level of the secondary signal 49.

The network nodes 230, shown in FIG. 5, have receivers (data/video decoders) 100 which include an error detector 167. That determines the error rate for the transmitted secondary signal 49 received from the network hub 210. The error detector 167 in the data/video decoder 100 generates error information 94. The error information 94 is sent from the data/video decoder 100 to the control unit 236, which then passes the error information 94 to the back channel modulator 234. The back channel modulator 234 of network nodes 230 may then transmit the error information 94 back to the network hub 210 via lines 208, whenever there is an error or only if it exceeds a predetermined threshold. The error information 94 is then received by the processor 10 in the network hub 210 and used to dynamically control the injection level of the secondary signal 49.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

We claim:

1. A processor for combining a primary color video signal having a luminance and a chrominance portion with the chrominance portion being in an upper portion of a bandwidth of the video signal with a color carrier in the upper portion and a power level with a secondary signal having a bandwidth greater than 100 KHZ for subsequent transmission, the processor comprising:

a primary signal section providing the primary video signal after attenuating a portion of the primary video signal within the band and above the color carrier;

a secondary signal section providing a rasterized version of the secondary signal for injection into the primary video signal; and a dynamically controlled level injector for injecting the rasterized secondary signal into the attenuated portion of the primary video signal at different injection levels into the primary video signal.

2. A processor according to claim 1, wherein the dynamically controlled level injector includes a gain controlled amplifier.

3. A processor according to claim 1, further comprising a video analyzer analyzing a power level of at least one portion of the primary video signal and providing a control signal to the dynamically controlled level injector based upon the power level, and wherein the dynamically controlled level injector alters the injection level of the secondary signal in response to the control signal.

4. A processor according to claim 3, wherein the injection level of the secondary signal substantially matches the attenuated power of the analyzed portion of the primary video signal.

5. A processor according to claim 3, responsive to error information representative of transmission errors detected in the reception of the secondary signal, and wherein the dynamically controlled level injector alters the injection level of the secondary signal to reduce errors in response to the error information and the control signal.

6. A processor according to claim 1, responsive to error information representative of transmission errors in receiving the secondary signal, and wherein the dynamically controlled level injector alters the injection level of the secondary signal to reduce errors in response to the error information.

7. A processor according to claim 6, wherein the dynamically controlled level injector decreases the injection level of the secondary signal in response to certain conditions of the error information indicating an error rate below a predetermined level.

8. A processor according to claim 6, wherein the error information fails to indicate an error for a time interval, and the dynamically controlled level injector decreases the injection level of the secondary signal.

9. A processor according to claim 1, wherein the secondary signal is injected such that the secondary signal is at least partially frequency interleaved within the primary video signal.

10. The processor of claim 1, further including:

a video analyzer for analyzing the average power in at least one portion of the spectrum of the video signal over a predetermined time interval; and a controller responsive to the analyzer and altering the injection level of the rasterized secondary signal in a predetermined relationship to the average power level such that interference from the rasterized secondary signal is not visually perceptible at a television receiving the combined signal.

11. The processor of claim 10, wherein the analyzer analyzes the average power in at least two different portions of the spectrum.

12. The processor of claim 11, wherein the first portion is within the luminance bandwidth and the second portion is within the chrominance bandwidth.

13. A method of combining a primary video signal having a bandwidth with upper and lower ends, a luminance portion an a color portion nearer the upper end and a color carrier with a secondary signal having a bandwidth greater than 100 KHz for subsequent transmission based upon a control signal, the method comprising:

attenuating a part of the color portion above the color carrier;

rasterizing the secondary signal for injection into the primary video signal;

dynamically controlling an injection level to different levels for the secondary signal; and injecting the secondary signal into the primary video signal in the attenuated portion.

14. A method according to claim 13, further comprising:

analyzing a power level of at least one portion of the primary video signal;

generating a control signal based upon the power level of the analyzed portion of the primary video signal; and altering the injection level of the rasterized secondary signal in response to the control signal.

15. A method according to claim 14, further comprising attenuating the power level of the analyzed portion of the primary video signal before injection of the secondary signal.

16. A method according to claim 15, further comprising substantially matching the injection level of the rasterized secondary signal to the attenuated power level of the analyzed portion of the primary video signal.

17. A method according to claim 14, further comprising:

changing the control signal to respond to error information representative of transmission errors in receiving the secondary signal; and dynamically altering the injection level of the rasterized secondary signal in response to the control signal to reduce errors.

18. A method according to claim 14, further comprising:

responding to error information representative of transmission errors in receiving the secondary signal; and increasing the injection level of the rasterized secondary signal to reduce errors in response to the error information.

19. A method according to claim 18, further comprising dynamically decreasing the injection level of the secondary signal in response to certain conditions of the error information indicating an error rate below a predetermined level.

20. A method according to claim 18, further comprising decreasing the injection level of the secondary signal after the error information fails to indicate an error for a time interval.

21. A method according to claim 13, further comprising injecting the rasterized secondary signal such that secondary signal is at least partially frequency interleaved within the primary video signal.

22. The method of claim 13, wherein the rasterized secondary signals are amplitude modulated before injection.

23. The method of claim 14, wherein at least a portion of the primary video signal has an average power and the method further comprises:

increasing the injection level of the secondary signal when the controller signal indicates that the average power has increased such that the data is not visually perceptible as interference to a television receiver; and decreasing the injection level of the secondary signal when the control signal indicates that the power has decreased such that the data is not visually perceptible as interference to a television receiver.

24. The method of claim 23, wherein the analyzed portions of the video signal comprise a portion in the luminance portion of the primary video signal and in the chrominance portion of the signal.

25. The method of claim 24, wherein the injection level is increased in response to an increase above a predetermined amount in the power of either the chrominance or the luminance portion of the primary video signal.

26. The method of claim 24, wherein the injection level is altered according to a predetermined relationship so that there are no visually perceptible effects of the data in a television receiver receiving the combined signal.

27. The method of claim 24, wherein the injection level is altered according to a stored relationship.

* * * * *